(12) United States Patent
Wang (10) Patent No.: US 7,988,196 B2
(45) Date of Patent: Aug. 2, 2011

(54) LAP LOOP THREE POINT SEATBELT SYSTEM

(75) Inventor: Bin Wang, Ontario (CA)

(73) Assignee: Autoliv ASP, Inc., Ogden, UT (US)

( * ) Notice: Subject to any disclaimer, the term of this patent is extended or adjusted under 35 U.S.C. 154(b) by 279 days.

(21) Appl. No.: 12/207,741

(22) Filed: Sep. 10, 2008

(65) Prior Publication Data
US 2010/0059980 A1    Mar. 11, 2010

(51) Int. Cl.
*B60R 22/00* (2006.01)

(52) U.S. Cl. .................. 280/801.1; 280/801.2; 280/802; 280/803; 280/808

(58) Field of Classification Search ............... 280/801.1, 280/801.2, 802, 803, 808
See application file for complete search history.

(56) References Cited

U.S. PATENT DOCUMENTS

| | | | |
|---|---|---|---|
| 4,159,120 A * | 6/1979 | Fohl .............................. | 280/806 |
| 4,231,616 A | 11/1980 | Painter | |
| 4,396,228 A | 8/1983 | Go | |
| 5,076,608 A * | 12/1991 | Shimose .................... | 280/801.1 |
| 5,306,044 A * | 4/1994 | Tucker ....................... | 280/801.1 |
| 5,599,070 A * | 2/1997 | Pham et al. .................. | 297/483 |
| 5,909,927 A * | 6/1999 | Henshall ....................... | 297/468 |
| 6,213,508 B1 * | 4/2001 | Cornell ...................... | 280/801.1 |
| 6,520,588 B1 * | 2/2003 | Busch ........................... | 297/483 |
| 6,623,037 B2 | 9/2003 | Ritters et al. | |
| 6,899,353 B2 * | 5/2005 | Volk ........................... | 280/801.1 |
| 7,011,341 B2 * | 3/2006 | Herberg et al. ............... | 280/807 |
| 7,059,445 B2 * | 6/2006 | Higuchi et al. ............... | 180/268 |
| 7,201,399 B2 * | 4/2007 | Frank et al. ................. | 280/801.1 |
| 7,628,349 B2 * | 12/2009 | Clute et al. .................. | 242/378.4 |
| 2004/0012187 A1 | 1/2004 | Wu | |
| 2004/0070191 A1 | 4/2004 | Higuchi et al. | |

FOREIGN PATENT DOCUMENTS

| | | |
|---|---|---|
| DE | 101 16 921 C1 | 6/2002 |
| GB | 2 349 615 A | 11/2000 |
| JP | 3-109152 | 5/1991 |

* cited by examiner

*Primary Examiner* — Toan C To
(74) *Attorney, Agent, or Firm* — Sally J. Brown; Brinks Hofer Gilson & Lione (57) ABSTRACT

A seatbelt assembly for motor vehicle occupant restraint applications of the three point type in which a lap belt section is formed of two layers of seatbelt webbing. The system may be implemented in connection with single or dual seatbelt retractors. A loop tongue is provided which is releasably affixed to a seatbelt buckle and has at least one slot which allows the free movement of webbing through the tongue between the use and storage conditions of the seatbelt system. An end of the webbing is also attached to the tongue. The system is operated by an occupant in a manner like a conventional three point restraint system using a single releasable attachment. Through the use of a pair of thicknesses of webbing in the lap belt section of the restraint system, control of reduced chest deflection and pelvic excursion may be provided.

41 Claims, 8 Drawing Sheets

LAP LOOP THREE POINT SEATBELT SYSTEM

FIELD OF THE INVENTION

This invention relates to a motor vehicle safety restraint system and particularly to a belt-type restraint system.

BACKGROUND OF THE INVENTION

Significant advancements have been made in motor vehicle crash protection in recent decades. These improvements have been provided through numerous technologies. Particularly significant have been advancements in the area of occupant restraints. Occupant restraints can be divided into passive and active categories, with the most widely employed passive restraint system in the form of pyrotechnically inflated airbags. These devices can be used for frontal and side impact scenarios, as well as other crash conditions. Active restraint systems most commonly take the form of a manually fastened seatbelt restraint system. A combination of active and passive restraint systems, enhanced vehicle crashworthiness, and other features have led to safer vehicles.

Active type seatbelt systems in typical use in modern passenger motor vehicles are of the so-called three point variety. These systems include a lap belt portion which extends across the lower torso of the occupant and an upper or shoulder belt section passing diagonally across the upper torso of the occupant. The system is fastened and released using a single buckle. In order to provide enhanced comfort and convenience, and accommodate various operators and use conditions, seatbelt webbing retractors are provided. These devices stow a length of webbing on a rotationally biased spool that provides retraction and extraction of webbing. Active seatbelt systems are maintained in a stowed condition when the vehicle is unoccupied, and does not interfere with occupant ingress and egress. These belt systems are manually donned as the occupant fastens the belt to a buckle, extending the shoulder belt and lap belt sections across the occupant.

Today's three point belt systems may be of a type using a single belt retractor in which one end of the belt is anchored to the vehicle, and the other is affixed to the retractor spool. In such systems, a sliding latch plate or tongue is used which is slid along the webbing to provide an appropriate length of the lap and shoulder belt sections for a particular user. Another type in wide-spread use is a dual retractor system in which the tongue is affixed to two separate lengths of webbing, one of which provides the shoulder belt section and is coupled to a shoulder belt retractor, and another length of webbing provides the lap belt section and is coupled to a lap belt retractor.

Numerous additional components and systems have been developed and implemented to enhance the comfort and convenience, and occupant protection provided by belt restraint systems. For example, a host of retractor control systems are used to allow the occupant to extend and retract the webbing from the retractor during normal use, but which lock upon a detected vehicle deceleration, which is known as an emergency locking retractor function. Webbing pretensioners are provided to preload the belt restraint system by taking up webbing slack upon the detection of an actual or imminent vehicle impact. Many of the pretensioner systems are pyrotechnically activated and therefore may be fired only once, generally upon the detection of an actual vehicle impact. Categories of these devices include pyrotechnic lap pretensioners (PLP) which are typically linear stroke devices at the anchor side of a lap belt mounted to the seat or floor pan. Pyrotechnic buckle pretensioners (PBP) are also typically linear stroke devices and are mounted to the buckle of a three point belt system. Retractor pretensioners act on the retractor spool to cause rapid retraction of belt webbing. A new generation of retractors includes so-called pre-pretensioners which are typically electric motor driven and provide retraction of webbing upon the detection of an imminent vehicle impact and operate in a reversible manner.

The technology of controlling occupant kinematics during vehicle impacts has also undergone fundamental advancements. Automotive engineers seek to provide a high degree of control of the occupant kinematics during an impact over a variety of impact types and severities, as well as for different occupant classifications of size, weight, and occupant position. The degree of displacement or excursion of the occupant during impacts is managed in order to reduce belt loads and the severity of occupant impacts with other structures within the vehicle. Single retractor systems pose an additional design challenge. Since the belt tongue may slide along the belt webbing during an impact, belt forces may cause the webbing to move through the belt tongue and thereby change the effective lengths of the lap and shoulder belt sections. There is a desire to reduce this "load redistribution" between the lap and shoulder belt sections.

Even through the use of dual retractor systems, it is a challenge to provide a desired degree of control of excursion of the occupant's lower torso. Excessive excursion of the occupant's lower torso can result in high femur loads being applied as the occupant engages the vehicle instrument panel and adjacent structure during a frontal impact. Excessive lower torso excursion may also result in "submarining" in which the occupant partially slides under the lap belt section, which is undesirable. Furthermore, in order to reduce the severity of occupant injuries in dynamic events, there is a desire to decrease chest deflection which can be achieved by reducing shoulder belt loads. At the same time, reducing femur loads requires earlier coupling between the occupant and the lap belt.

In addition to continuously striving for enhanced occupant protection, automotive engineers further seek to reduce the complexity, weight and packaging volume requirements of automotive components as vehicles become more fuel efficient. Furthermore, when performance enhancements are provided for belt restraint systems, it is desirable to maintain the ease with which the system is donned and released.

SUMMARY OF THE INVENTION

In accordance with this invention, a motor vehicle three point type seatbelt system is provided having improvements in the aforementioned areas of design challenges. In several embodiments of the present invention, a three point seatbelt system is provided in which the lower or lap belt section of the webbing is routed and oriented to form a "lap loop" in which two layers of seatbelt webbing are present for the lap belt section, whereas a single layer of webbing is used for the shoulder belt section. In one group of embodiments of the present invention, this system is implemented with a single belt retractor. Various webbing routing approaches may be implemented, but each uses a tongue which can be freely moved along the webbing to adapt to different occupants. Once fastened, the two layers of webbing on the lap belt section provide more resistance to elongation and thereby enhance control of lower torso excursion since the restraint load acts on both webbing layers. In addition, the lap loop of the webbing in accordance with this invention increases friction acting on the webbing at the belt tongue which aids in maintaining the desired length of the lap and shoulder belt sections during an impact event. Since the tongue freely slides along the webbing when it is stowed, the system provides a loop tongue which falls to a lower or desired "park" position when it is not fastened to a vehicle occupant (i.e. a "free-falling" tongue) and thus presents the tongue at a convenient location for the occupant to grasp it and insert it into the buckle when the system is being donned. If desired, the tongue can also be a "free-running" tongue so it can be positioned in a convenient location on the belt webbing when the belt is stowed.

In another series of embodiments of the present invention, the dual layer or lap loop belt section is implemented in connection with a dual retractor system. Such systems include retractors connected with separate lengths of webbing, but still provide two layers of webbing at the lap belt section.

In yet another series of embodiments of the present invention, a seatbelt system is described in which the lap belt portion of the three point belt assembly is formed by two layers of webbing or webbing having greater modulus of elasticity through its material selection or based on its thickness or width as compared with the remainder of the webbing forming the shoulder belt section. These embodiments are described in connection with a single retractor system having a sliding tongue.

The performance features of the seatbelt system of the present invention can provide not only improvements in occupant kinematics, but may also reduce the need to rely on pretensioner systems such as those described previously while providing exceptional performance. The seatbelt systems of the present invention are easily used by occupants since they are donned and released in the manner of conventional three point active seatbelt systems.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
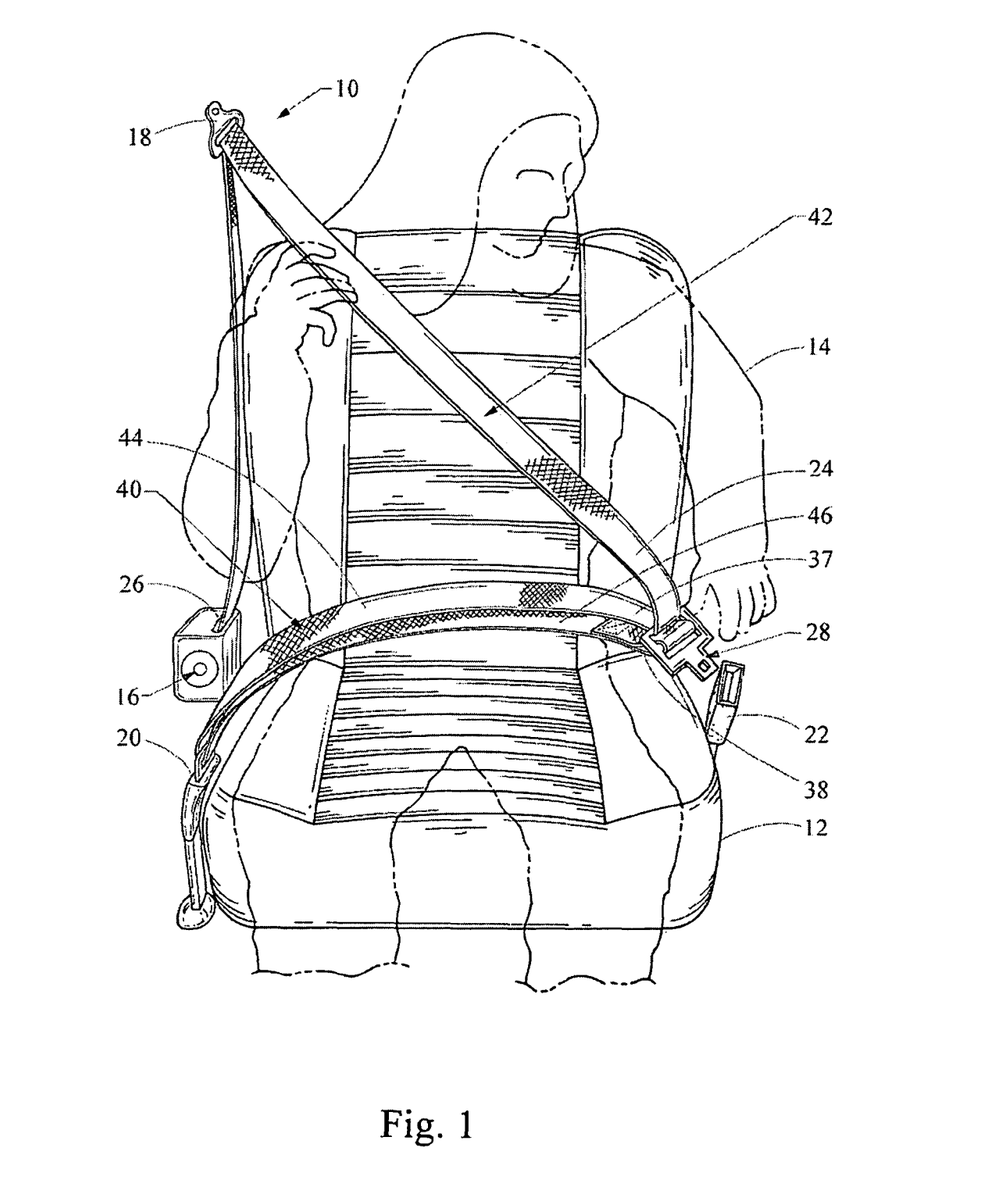
FIG. 1 is a front view of a motor vehicle seat with a seated occupant with a seatbelt system in accordance with the first embodiment of the invention shown being fastened for restraint of the occupant.
Figures 2, 3, 4:
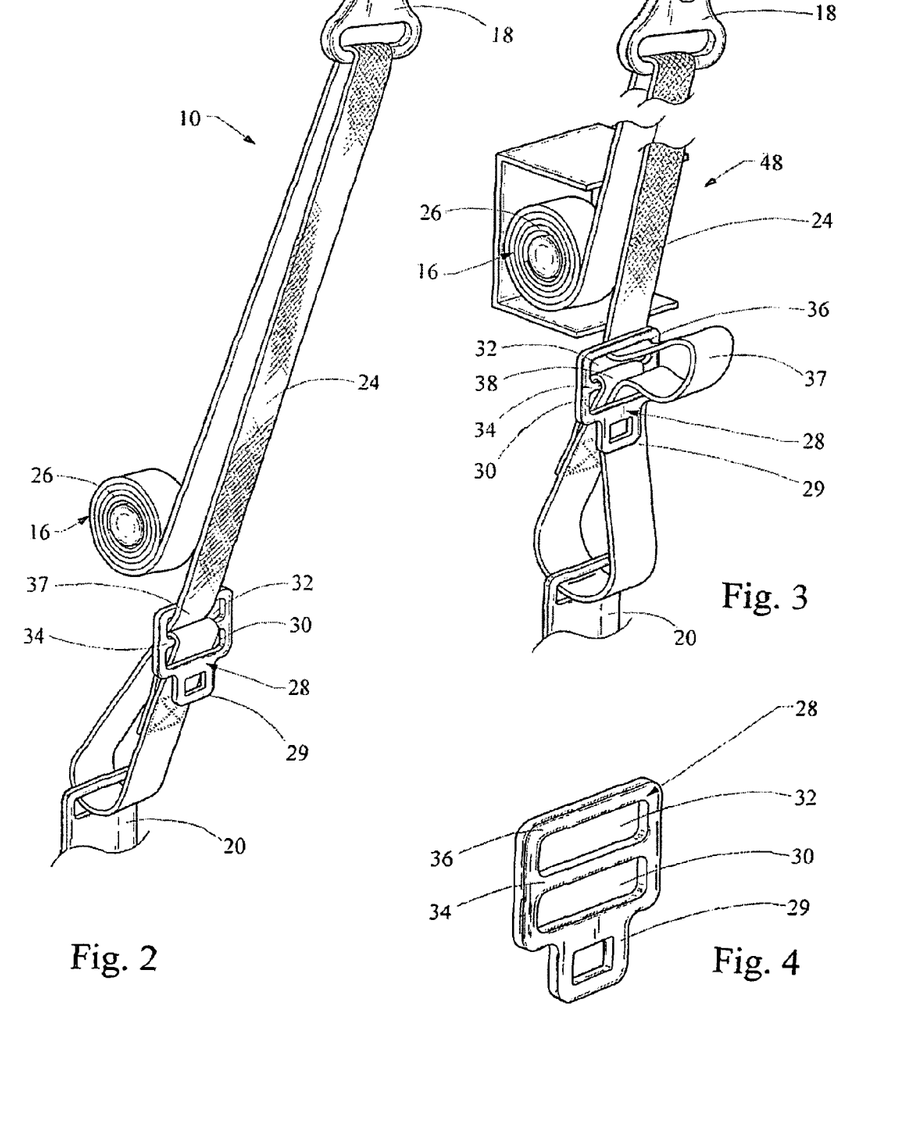
FIG. 2 is a partial pictorial view taken from FIG. 1 showing the first embodiment of a restraint system in accordance with this invention.
FIG. 3 is a partial pictorial view similar to FIG. 2 but showing a second embodiment of a restraint system in accordance with the present invention.
FIG. 4 is a perspective view of the loop tongue which may be used in connection with embodiments of the present invention.

A motor vehicle seatbelt restraint system in accordance with the first embodiment of this invention is illustrated in FIGS. 1 and 2, and is generally designated by reference number 10. Seatbelt system 10 is shown associated with a motor vehicle seat 12 and in a fastened or donned condition for restraining occupant 14. Seatbelt system 10 principally includes retractor 16, upper guide loop 18, lap anchor plate 20, buckle 22, webbing 24, and loop tongue 28. Guide loop 18 is affixed to an upper structural component of the vehicle such as a door header rail. Similarly, lap anchor plate 20 and buckle 22 are mounted to structural members of the vehicle, such as the vehicle floor pan. Guide loop 18 and lap anchor plate 20 allow belt webbing 24 to freely slide therethrough. The restraint systems in accordance with this invention may also be implemented with the mounted components mentioned previously, including retractor 16, guide loop 18, lap anchor plate 20, and buckle 22, attached directly to the vehicle seat 12, which would be a type referred to as an integrated structural seat (ISS). For such implementations, the seat 12 is structurally coupled with the vehicle to withstand impact loads exerted by the belt restraint system.

Referring particularly to the embodiment of seatbelt system 10 shown in FIGS. 1 and 2, end 26 of seatbelt webbing 24 is mounted to an internal spool of seatbelt retractor 16. Retractor 16 may be of one of numerous types, and for example, may include various retractor control features including emergency locking functions, as well as pretensioner systems, load limiting functions, and other retractor control systems. Webbing 24 is routed, in order, from retractor 16, upwardly through guide loop 18, downwardly through loop tongue 28, wrapping around lap anchor plate 20, and then terminates at a second end 38 at loop tongue 28. Seatbelt system 10, like the other embodiments described herein, is a three point type, and has a single latching connection; namely, between buckle 22 and tongue 28 which the occupant operates to don and release the system. It should be noted that three point restraint systems, like those described herein may have more than three points of attachment to the vehicle. Here, retractor 16, guide loop 18, lap anchor plate 20 and buckle 22 are all structurally mounted to the vehicle. The three points of the three point restraint system are formed by the ends of the lap and shoulder belt sections 40 and 42. Lap belt section 40 extends across the pelvis of the occupant 14 between lap anchor plate 20 and buckle 22, whereas shoulder belt section 42 extends diagonally across the upper torso of the occupant between buckle 22 and guide loop 18.

From a structural perspective, all of the mounted components of system 10 act as belt system anchors. Each of the components, including retractor 16, guide loop 18, lap anchor plate 20, and buckle 22 are fastened securely to the vehicle structure.

As shown best by FIG. 4, loop tongue 28 has a pair of slots including first slot 30 and second slot 32 formed by first bar 34 and second bar 36. Loop tongue 28 has buckle engaging tab 29 which is received by buckle 22 to secure the tongue to the buckle. The tongue slots and bars are oriented and positioned, in order moving upwardly when viewing tongue 28 as shown in FIG. 4, from first slot 30 which is adjacent tab 29, and then first bar 34, second slot 32, and second bar 36 which forms the tongue edge farthest from tab 29.

FIGS. 1 and 2 show the routing of webbing 24 through loop tongue 28 in accordance with a first embodiment of the invention. As illustrated, webbing end 38 is affixed to bar 34 and is wrapped around that bar and stitched. The webbing 24 also has a segment 37 which passes through second slot 32. For these applications, it is desirable to form slot 32 to be sufficiently wide and free of sharp edges such that relatively free passage of the webbing 24 occurs through the slot as the belt system is being donned and released by the occupant and as it adjusts while it is worn. In the donned condition, lap belt section 40 forms a lap loop with two layers 44 and 46 of webbing 24. The layers 44 and 46 preferably directly overlay each other. The webbing 24 that forms the lap belt section 40 and the shoulder belt section 42 preferably have an identical width and thickness (i.e. referring to their cross-sectional dimensions) and are otherwise of an equivalent material type.

FIG. 2 illustrates the position of the components of seatbelt assembly 10 when in the stowed, parked, or unused condition. The webbing retraction force provided by retractor 16, and the freedom of the webbing 24 to slide through guide loop 18, lap anchor plate 20, and tongue 28, enable the tongue to fall to the position shown in FIG. 2. This characteristic is referred to as a "free-falling" tongue. This positions the tongue 28 in a convenient position to be grasped by the occupant when it is desired to don or fasten the system. Tongue 28 is held in a position next to occupant 14 through tension applied between guide loop 18 and lap anchor plate 20. A button or webbing restrictor (not shown) may be used to establish a desired "park" position of tongue 28. When the occupant 14 desires to don the system, belt loop tongue 28 is grasped and pulled across the occupant. Such motion pulls webbing 24 through guide loop 18, lap anchor plate 20, and through tongue 28 until the tongue is fastened into buckle 22. This action causes the two layers 44 and 46 forming lap belt section 40 to slide along each other. In the donned condition shown in FIG. 1, the retraction torque provided by the spool of retractor 16 reduces the slack in the webbing 24 against the occupant.

In an impact condition, the dual layers of webbing 44 and 46 present in the lap belt section 40 provide a reduction of occupant excursion of the lower torso since the restraint loads act on both layers. Thus, the two layers, acting together have a greater modulus of elasticity (ratio of applied tensile force to elongation) as compared with a single layer of shoulder belt section 42. The webbing layers 44 and 46 of the lap belt section 40 are in contact with each other, and this contact, together with the friction imposed on the webbing segment 37 as it is routed through tongue 28, restrict the webbing 24 from freely flowing through the tongue during a vehicle impact. This provides a degree of isolation in the reaction of the lap and shoulder belt sections 40 and 42.

It should be noted that retractor 16 may be located at various position and, in fact, could be mounted at the position shown for guide loop 18 in the figures, thus eliminating the guide loop and allowing the webbing to extend directly from retractor 16 across the upper torso of the occupant. In addition, not shown are devices such as a loop or clip which could be attached at webbing layers 44 and 46 to maintain them in contact, while allowing relative sliding movement between the layers.

FIG. 3 provides a pictorial view of a seatbelt system 48 in accordance with a second embodiment of the present invention. Except as otherwise noted, seatbelt system 48 is identical in configuration with system 10 described in connection with FIGS. 1, 2, and 4. The difference of seatbelt assembly 48 from assembly 10 is the routing of webbing segment 37 through loop tongue 28. In this case, like the first embodiment, webbing end 38 is connected with tongue bar 34, however, the webbing passes through both slots 30 and 32 (a loose loop of webbing segment 37 is shown in FIG. 3 for illustrative purposes only). In system 48, when in the stowed condition (shown), belt end 38 is positioned outboard of the webbing segment 37 sliding through tongue 28, whereas it is positioned inboard in system 10. Depending on application, belt systems 10 and 48 may have differences in the freedom of motion of belt tongue 28 along the webbing segment 37 and have different friction characteristics when tension is applied to the webbing during an impact condition. For both embodiments of systems 10 and 48, webbing 24 is provided as one length of webbing which forms the lap and shoulder belt sections 40 and 42.

Figure 5:
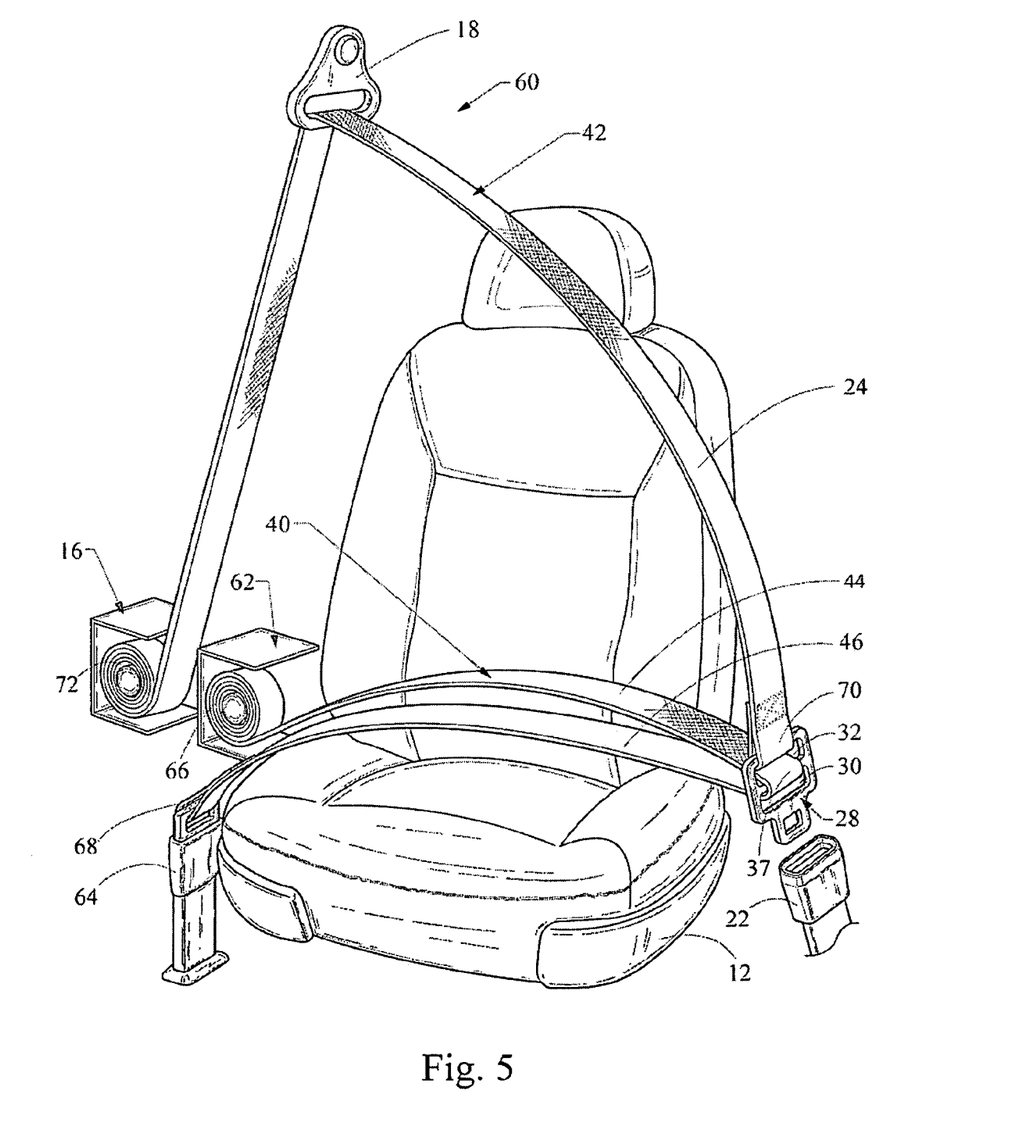
FIG. 5 is a pictorial view of a third embodiment of the present invention illustrating use of a two separate retractors.

FIG. 5 illustrates a third embodiment of a seatbelt system 60 in accordance with the present invention. For this embodiment, rather than using a lap anchor plate 20 which the webbing 24 slides through, the lower end 66 of webbing 24 is affixed to a second retractor, referred to here as a lap belt retractor 62. For this implementation, the first retractor 16 is connected with shoulder belt section 42. As shown in this embodiment, webbing 24 is divided into two separate lengths of webbing with shoulder belt section 42 being formed from one length, whereas both layers 44 and 46 of the lap belt section 40 are formed by a second length of webbing. As shown, the webbing 24 of lap belt section 40 is connected with lap anchor plate 64 at end 68, and is wrapped through slots 30 and 32 of loop tongue 28 with its opposite end 66 coupled to retractor 62. The shoulder belt section 42 is fixed at one end 70 to loop tongue 28 by wrapping around upper bar 36 with its other end 72 attached within retractor 16. With this embodiment, guide loop 18 is also provided for guiding the belt. FIG. 5 (and FIG. 6 discussed below) shows webbing layers 44 and 46 spaced apart for illustrative purposes. In use, the layers 44 and 46 would overlay each other as in the other embodiments.

In use, donning of seatbelt system 60 is generally similar to that of the prior embodiments in that tongue 28 is grasped and pulled to allow it to be inserted into buckle 22. This causes sliding of the webbing segment 37 through the tongue 28 so that the webbing extends across the occupant. At the same time, retractor 16 allows the extraction of webbing 24 of shoulder belt section 42 in accordance with conventional belt system designs. Otherwise, the system 60 operates in a manner similar to that of the prior embodiments in that two layers 44 and 46 or a double thickness of webbing 24 is present in the lap belt section 40.

Figure 6:
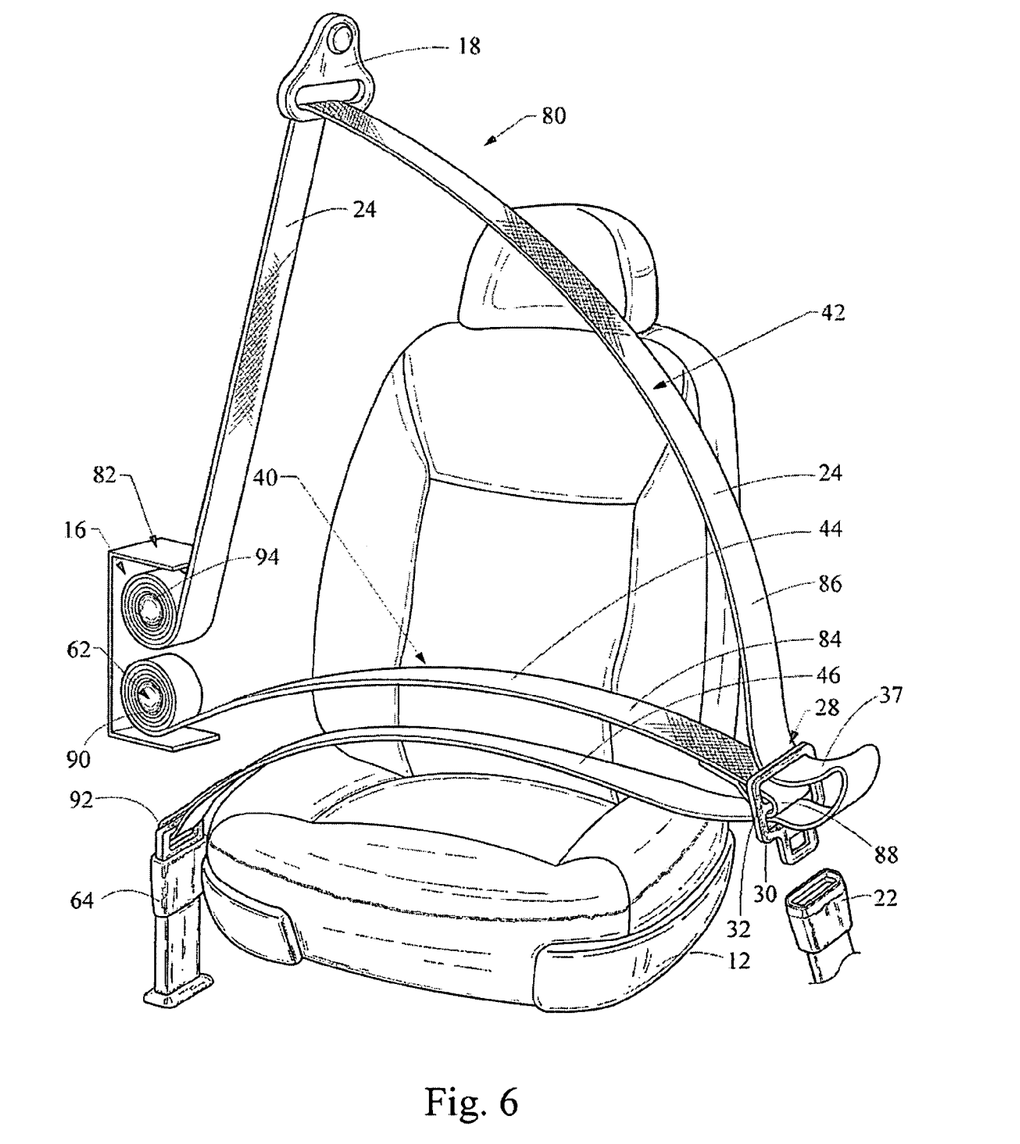
FIG. 6 is a pictorial view similar to FIG. 5 showing dual spool retractor system implemented in accordance with a fourth embodiment of the present invention and showing an alternate embodiment of a webbing routing approach used with a dual or two retractor system.

FIG. 6 illustrates seatbelt system 80 in accordance with a fourth embodiment of this invention. Belt system 80 is similar to belt system 60 with two differences, one being the use of an integrated dual spool retractor 82 which combines two separate retractors 16 and 62 into a common frame. This embodiment also differs in the routing of the webbing 24. In this instance, the lap belt section 40 is formed by two separate lengths of webbing 24. A first length of webbing 84 forms one layer of webbing of lap belt section 40, and is fastened at end 88 to tongue bar 34 and extends and terminates at end 90 at retractor 62. Another length of webbing 86 extends from end 92 fastened to anchor plate 64 through tongue slots 30 and 32, and upward through guide loop 18, and finally attaches at end 94 to retractor 16. In this embodiment, the lap belt section 40, like the prior embodiments, is formed of two layers 44 and 46 of webbing (shown separated for illustration only). However, each of these webbing layers 44 and 46 are not directly connected to each other in this embodiment and each are engaged with separate retractors 16 and 62.

Figure 7:
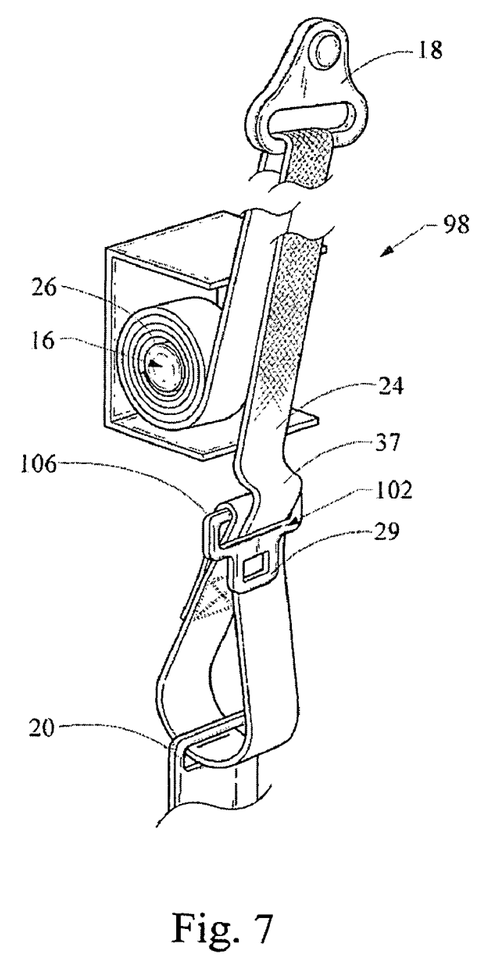
FIG. 7 is a pictorial view of a seatbelt system in accordance with a fifth embodiment utilizing a belt tongue in accordance with an alternate embodiment of the present invention.
Figure 8:
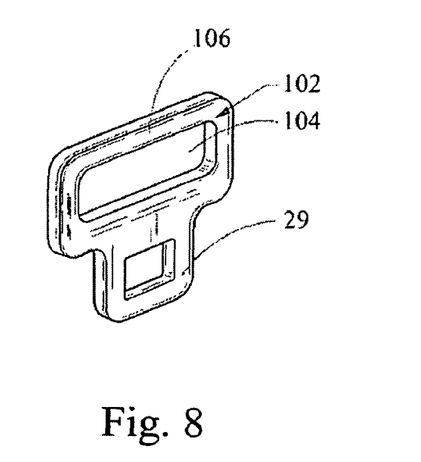
FIG. 8 is a perspective view of a tongue using connection with the embodiment of the invention illustrated in FIG. 7.

Now with reference to FIGS. 7 and 8, an alternate embodiment of a seatbelt system in accordance with a fifth embodiment of this invention is illustrated and generally designated by reference number 98. Seatbelt system 98, except as otherwise noted, is identical to seatbelt system 48 shown in FIG. 3. For this embodiment, however, a modified form of tongue 102 is employed. The configuration of tongue 102 is also illustrated in FIG. 8. Tongue 102 has a configuration similar to that of conventional seatbelt tongues in that it forms a single slot 104 and a single bar 106. Tongue 102 is, in principle, equivalent to tongue 28 with the upper bar 36 of tongue 28 removed. In this case, webbing segment 37 passes only through slot 104 and does not loop through a second slot as in the system shown in FIG. 3 (and FIG. 6). As with the prior embodiment, slot 104 would provide sufficient width to enable webbing segment 37 to freely pass through it during adjustment of the seatbelt system 98. Elements of seatbelt system 98 common with prior embodiments are identified by like reference numbers. In operation, seatbelt system 98 operates in the manner of seatbelt system 48 shown in FIG. 3. The embodiment of tongue 102 may also be used in connection with a modified form of the seatbelt assembly 80 illustrated in FIG. 6. Again, the modified tongue 102 is used and webbing segment 37 simply passes through a single slot 104 before being routed to pass to guide loop 18 and downwardly to the associated belt retractor. The system 98 otherwise operates like the previously described embodiments.

For each embodiment described above and shown in FIGS. 1 through 8, certain features are common. First, each features two layers 44 and 46 forming the lap belt sections 40. Second, each of the layers 44 and 46 slide relative to one another during donning of the systems. Third, at least one of the layers 44 or 46 is fixed to loop tongue 28, and the webbing segment 37 forming the other layer slides through one or more slots 30 and 32 (or 104) of the tongue 28 (or 102). Fourth, each of these embodiments is a three point belt system with a single latch used for donning and releasing the system. Fifth, the tongue 28 (and 102) is slidable along a webbing segment 37 and is held along side the seat 12 when stowed. Sixth, the systems 10, 48, 60, 80, and 98 are used by an occupant in the manner of a conventional three point active seatbelt system. And finally, in addition to other similarities noted elsewhere, the tongues 28 and 102 define an end point of both the lap and shoulder belt sections 40 and 42 when the systems are donned.

Figure 9:
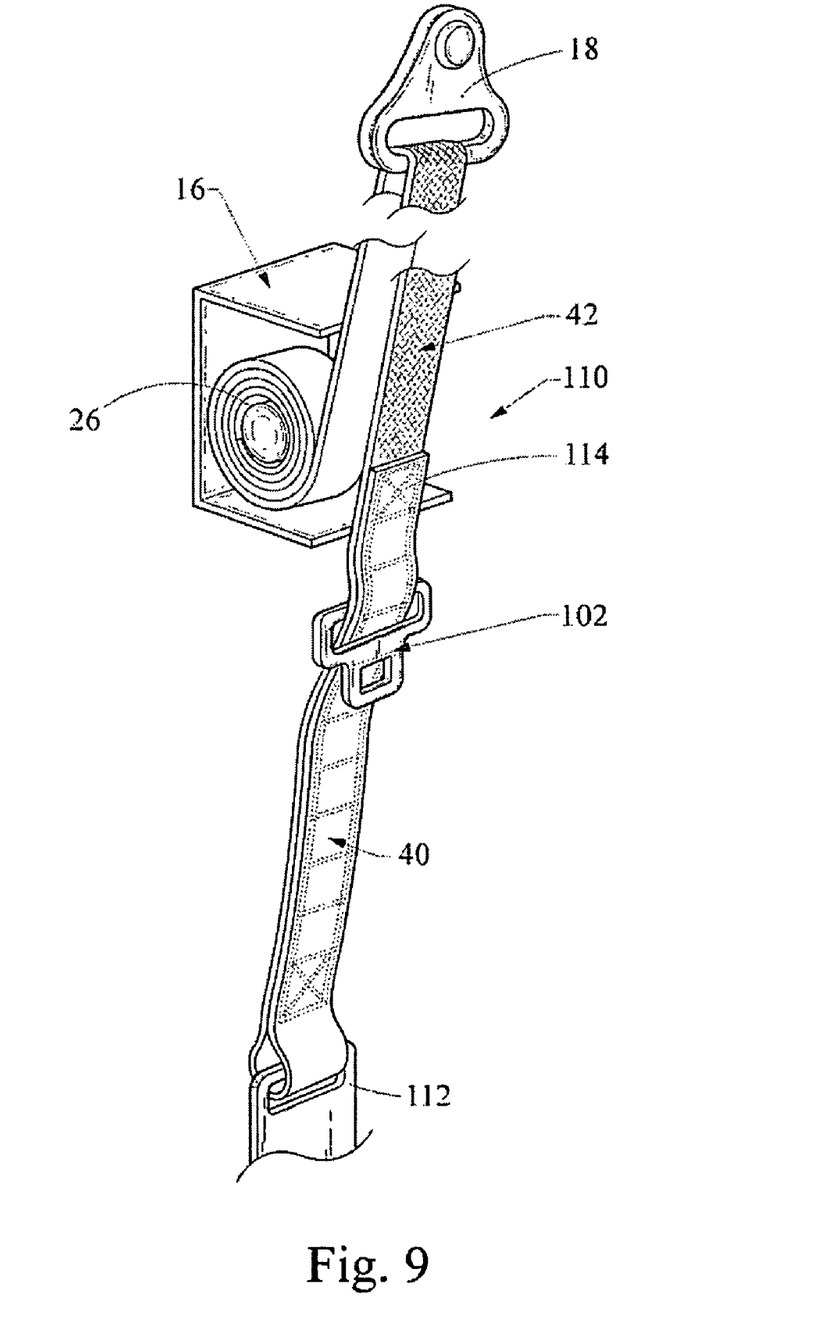
FIG. 9 is a pictorial view of a seatbelt system in accordance with a sixth embodiment of the present invention using a lap belt portion webbing material having different characteristics than the shoulder belt portion of the restraint system.
Figure 10:
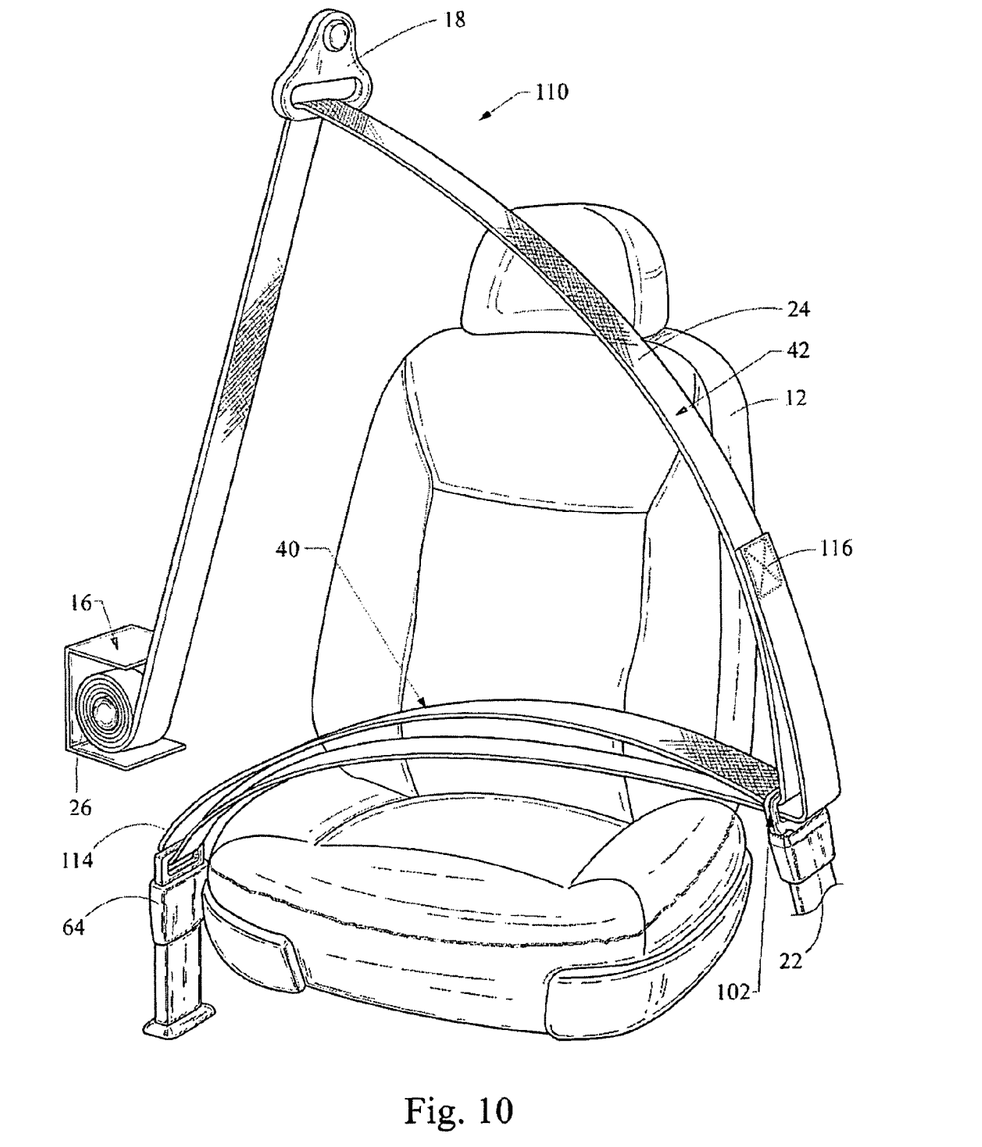
FIG. 10 is a pictorial view of the seatbelt system shown in FIG. 9 in a donned condition.

A seatbelt system in accordance with a sixth embodiment of this invention is illustrated in FIGS. 9 and 10 and designated by reference number 110. Seatbelt system 110 shares many components of the prior embodiment including retractor 16, guide loop 18, and buckle 22. This embodiment of seatbelt system 110 employs the alternate embodiment tongue 102 as illustrated in FIG. 8 and includes a single slot 104 and bar 106. For this embodiment, anchor 112 is employed which does not require webbing 24 to slide through it as in the case of anchor plate 20 shown in FIGS. 1, 2, and 5. For this embodiment, lap belt section 40 is formed by a double thickness of webbing 24. Webbing end 114 is looped through anchor 112 and sewn to the remainder of the webbing. Accordingly, while lap belt section 40 has a double thickness of webbing, shoulder belt section 42 has a conventional single thickness configuration. For this embodiment, tongue 102 slides along lap belt section 40 and unlike the prior embodiments, does not have an end of webbing affixed to it.

FIG. 10 illustrates seatbelt system 110 in accordance with a sixth embodiment of the invention. The length of lap belt section 40 is chosen such that its entire length is provided with a double thickness of webbing 24 for most occupants. Smaller stature occupants, or depending upon the adjusted seat position in some cases, a portion of the double thickness of lap belt section 40 may extend from tongue 102 toward guide loop 18 (as shown in FIG. 10). For other occupants, the junction 116 may be positioned between anchor 112 and tongue 102. However, the double thickness of webbing 24 in lap belt section 40 provides the previously mentioned benefits of reducing webbing elongation in that area. Since junction 116 may be positioned along the webbing at one side or the other of tongue 102 when the belt system is donned, it is described as providing at least a substantial portion of lap belt section 40 having dual layers, and similarly, a substantial portion of shoulder belt section 42 has a single layer. As with the prior embodiments, seatbelt system 110 is operated in a manner similar to the use of conventional three point active seatbelt systems. Elements of seatbelt 110 identical to previous embodiments are identified by like reference numbers.

Figure 11:
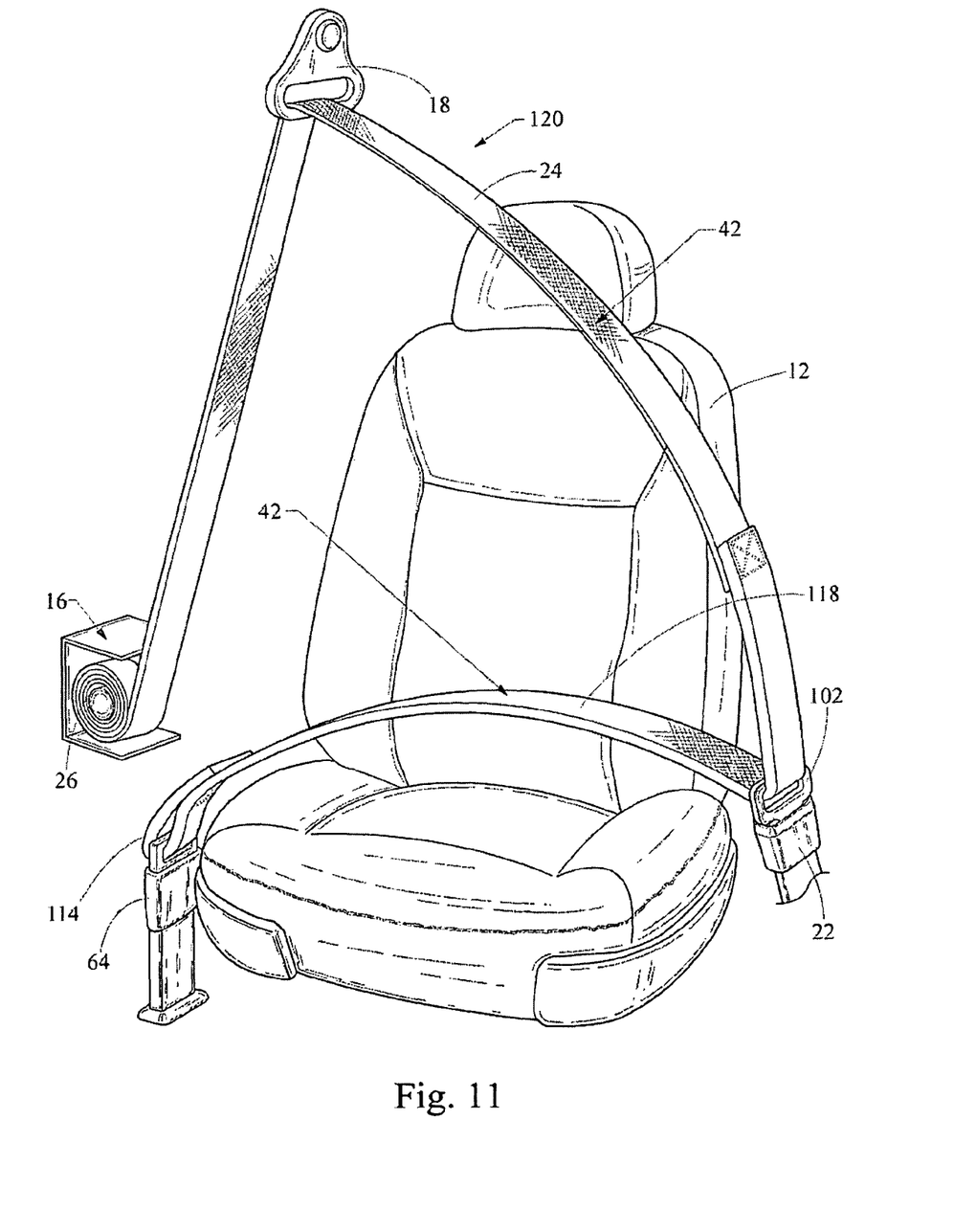
FIG. 11 is a pictorial view of a seatbelt system in accordance with a seventh embodiment of the invention using a lap belt portion having thicker webbing material than the shoulder belt portion of the restraint system.

As a further modification to seatbelt system 110, lap belt section 40 or a substantial portion thereof may be provided in the form of webbing 118 having different physical characteristics from the webbing forming shoulder belt section 42. This configuration is shown in FIG. 11 as a seventh embodiment of a seatbelt system 120. For example, lap belt section 118 may be formed from webbing material which is thicker or wider than that of the webbing forming shoulder belt section 42. As a further alternative, the material of the webbing could have different physical characteristics with regard to its modulus of elasticity.

While the above description constitutes the preferred embodiment of the present invention, it will be appreciated that the invention is susceptible to modification, variation, and change without departing from the proper scope and fair meaning of the accompanying drawings.

The invention claimed is:

1. A motor vehicle seatbelt restraint system for restraining an occupant in a seat, the restraint system being configured to provide a stowed condition and a donned condition wherein a shoulder belt section wraps across the upper torso of the occupant and a lap belt section wraps across the lower torso of the occupant, the belt system comprising:
    belt webbing in one or more lengths forming the shoulder belt section and the lap belt section, at least a substantial portion of the lap belt section having a greater modulus of elasticity as compared with at least a substantial portion of the shoulder belt section,
    a belt retractor affixed to the webbing and allowing extraction and retraction of the webbing as the system is changed between the stowed and the donned conditions,
    a buckle, and
    a tongue detachably affixable to the buckle, the tongue having a slot for allowing a segment of the webbing to pass through the tongue as the system is changed between the stowed and donned conditions, the lap and the shoulder belt sections extending from the tongue when the system is in the donned condition.

2. A motor vehicle seatbelt restraint system according to claim 1 wherein the substantial portion of the lap belt section is formed of two layers of the webbing and the substantial portion of the shoulder belt section is formed of one layer of the webbing and wherein the material of the webbing forming the layer of the shoulder belt section and the two layers of the lap belt portion are equivalent.

3. A motor vehicle seatbelt restraint system according to claim 2 wherein the webbing is in the form a single length of the webbing, and the webbing having an end affixed to itself to form the two layers of the lap belt section.

4. A motor vehicle seatbelt restraint system according to claim 1 wherein the webbing of the lap belt section is formed of a first material type and the webbing of the shoulder belt section is formed of a second material type and wherein the first material type has a greater modulus of elasticity when forming the lap belt section than that of the second material type of when forming the shoulder belt section.

5. A motor vehicle seatbelt restraint system according to claim 1 wherein in the stowed condition, the tongue is free to fall or run to a desired park position adjacent to the occupant.

6. A motor vehicle seatbelt restraint system according to claim 1 wherein the restraint system is an active three point type.

7. A motor vehicle seatbelt restraint system according to claim 1 further comprising an anchor for structurally connecting an end of the webbing to the vehicle through attachment to the vehicle or to the seat.

8. A motor vehicle seatbelt restraint system according to claim 1 further comprising an anchor for structurally connecting the webbing to the vehicle through attachment to the vehicle or to the seat, the anchor allowing the webbing to slide through the anchor as the system is changed between the stowed and donned conditions.

9. A motor vehicle seatbelt restraint system according to claim 1 wherein the lap belt section is formed by a loop of the webbing in the lap belt section with the webbing having an end affixed to the tongue and the loop forming two layers of the webbing in the lap belt section.

10. A motor vehicle seatbelt restraint system according to claim 9 further comprising a belt anchor plate mounted to the vehicle through attachment to the vehicle or to the seat and allowing the webbing of the lap belt portion to slide therethrough as the system is changed between the stowed and donned conditions.

11. A motor vehicle seatbelt restraint system according to claim 9 wherein each of the one or more lengths of the webbing have the same thickness and width.

12. A motor vehicle seatbelt restraint system according to claim 9 wherein the tongue forms at least one bar having the belt webbing end wrapped around and affixed to the bar.

13. A motor vehicle seatbelt restraint system according to claim 9 wherein the lengths of webbing forming the two or more layers of the lap belt section overlay each other when the system is in the donned condition.

14. A motor vehicle seatbelt restraint system according to claim 9 wherein the tongue slot forms a first slot and the tongue further forms a second slot and the segment of the webbing passing through both the first and second slots.

15. A motor vehicle seatbelt restraint system according to claim 9 wherein the webbing forms a first and a second webbing end with the first end affixed to the retractor and the second end affixed to the tongue, the webbing extending, in order, from the retractor, downwardly with the segment passing through the belt tongue, around an anchor plate, and terminating and attaching to the tongue at the second end.

16. A motor vehicle seatbelt restraint system according to claim 15 wherein the tongue forming a buckle engaging tab and first and second slots and first and second bars forming at least portions of the slots, the first slot positioned adjacent the tab and the second slot positioned farther from the tab than the first slot, the first bar positioned between the first and second slots and at least partially defining the first slot, and the second bar positioned farther from the tab than the first bar and defining at least a portion of the second slot.

17. A motor vehicle seatbelt restraint system according to claim 16 wherein the second end of the webbing is wrapped around and fastened to the first bar and the segment of the webbing passes through the second slot.

18. A motor vehicle seatbelt restraint system according to claim 16 wherein the second end of the webbing is wrapped around and fastened to the first bar and the webbing passes through the first and second slots.

19. A motor vehicle seatbelt restraint system according to claim 9 wherein the webbing includes a first webbing length forming a first and a second webbing end with the first end affixed to the retractor defining a first retractor and the second end affixed to the tongue, the first webbing length forming the shoulder belt section, a second webbing length forming a third and a fourth webbing end with the third end affixed to a second retractor and the fourth end affixed to a belt anchor, the second webbing length having the segment passing through the tongue and forming the two layers of the lap belt section.

20. A motor vehicle seatbelt restraint system according to claim 19 wherein first and second retractor are separate components mounted to the vehicle or to the seat.

21. A motor vehicle seatbelt restraint system according to claim 19 wherein the first and second retractors are integrated into a single frame mounted to the vehicle or to the seat.

22. A motor vehicle seatbelt restraint system according to claim 9 wherein the webbing includes a first webbing length forming a first and a second webbing end with the first end affixed to the retractor defining a first retractor and the second end affixed to a belt anchor, the first webbing length forming the shoulder belt section and first of the two layers of the lap belt section and the segment passing through the tongue, a second webbing length forming a third and a fourth webbing end with the third end affixed to a second retractor and the fourth end affixed to the tongue, the second webbing length forming a second of the two layers of the lap belt section.

23. A motor vehicle seatbelt restraint system of a typo for restraining an occupant in a seat, the restraint system being configured to provide a stowed condition and a donned condition wherein a shoulder belt section wraps across the upper torso of the occupant and a lap belt section wraps across the lower torso of the occupant, the belt system comprising:
   belt webbing in one or more lengths forming the shoulder belt section and the lap belt section,
   a belt retractor affixed to the webbing and allowing extraction and retraction of the webbing as the system is changed between the stowed and donned conditions,
   a buckle,
   a loop tongue detachably affixable to the buckle and having an end of the webbing affixed thereto, the tongue having a slot for allowing a segment of the webbing to pass through the tongue as the system is changed between the stowed and the donned conditions, the lap and shoulder belt sections extending from the tongue when the system is in the donned condition, and
   the retractor, the buckle, and the tongue arranged to form two layers of the webbing for the lap belt section and a single layer of the webbing for the shoulder belt section.

24. A motor vehicle seatbelt restraint system according to claim 23 wherein each of the one or more lengths of the webbing have the same thickness and width.

25. A motor vehicle seatbelt restraint system according to claim 23 wherein the tongue forms at least one bar having the belt webbing end wrapped around and affixed to the bar.

26. A motor vehicle seatbelt restraint system according to claim 23 wherein the webbing end affixed to the tongue and the segment passing through the tongue contact each other at or adjacent to the tongue.

27. A motor vehicle seatbelt restraint system according to claim 23 wherein the lengths of webbing forming the two or more layers of the lap belt section overlay each other when the system is in the donned condition.

28. A motor vehicle seatbelt restraint system according to claim 23 wherein the tongue slot forms a first slot and the tongue further forms a second slot and the belt webbing segment passing through both the first and second slots.

29. A motor vehicle seatbelt restraint system according to claim 23 wherein in the stowed condition, the tongue is free to fall or run to a desired park position adjacent to the occupant.

30. A motor vehicle seatbelt restraint system according to claim 23 wherein the system is an active three point type.

31. A motor vehicle seatbelt restraint system according to claim 23 further comprising an anchor for structurally coupling an end of the webbing to the vehicle through attachment to the vehicle or to the seat.

32. A motor vehicle seatbelt restraint system according to claim 23 further comprising an anchor in the form of an anchor plate which allows the webbing to slide through the anchor plate when the system is changed between the stowed and donned conditions.

33. A motor vehicle seatbelt restraint system according to claim 23 the webbing is comprised of a single length of webbing forming the shoulder belt section and the two layers of the lap belt section.

34. A motor vehicle seatbelt restraint system according to claim 33 wherein the webbing forms a first and a second webbing end with the first end affixed to the retractor and the second end affixed to the tongue, the webbing extending, in order, from the retractor, downwardly with the segment passing through the tongue, around an anchor, and terminating and attaching to the tongue at the second end.

35. A motor vehicle seatbelt restraint system according to claim 34 wherein the tongue forming a buckle engaging tab and first and second slots, and first and second bars forming at least portions of the slots, the first slot positioned adjacent the tab and the second slot positioned farther from the tab than the first slot, the first bar positioned between the first and second slots and at least partially defining the first slot, and the second bar positioned farther from the tab than the first bar and defining at least a portion of the second slot.

36. A motor vehicle seatbelt restraint system according to claim 35 wherein the second end of the webbing is wrapped around and fastened to the first bar and the webbing segment passes through the second slot.

37. A motor vehicle seatbelt restraint system according to claim 35 wherein the second end of the webbing is wrapped around and fastened to the first bar and the webbing passes through the first and second slots.

38. A motor vehicle seatbelt restraint system according to claim 23 wherein the webbing includes a first webbing length forming a first and a second webbing end with the first end affixed to the retractor defining a first retractor and the second end affixed to the tongue, the first webbing length forming the shoulder belt section, a second webbing length forming a third and a fourth webbing end with the third end affixed to a second retractor and the fourth end affixed to a belt anchor, the second webbing length having the segment passing through the tongue and forming the two layers of the lap belt section.

39. A motor vehicle seatbelt restraint system according to claim 38 wherein first and second retractor are separate components mounted to the vehicle or to the seat.

40. A motor vehicle seatbelt restraint system according to claim 38 wherein the first and second retractors are integrated into a single frame mounted to the vehicle or to the seat.

41. A motor vehicle seatbelt restraint system according to claim 23 wherein the webbing includes a first webbing length forming a first and a second webbing end with the first end affixed to the retractor defining a first retractor and the second end affixed to a belt anchor, the first webbing length forming the shoulder belt section and first of the two layers of the lap belt section and the segment passing through the tongue, a second webbing length forming a third and a fourth webbing end with the third end affixed to a second retractor and the fourth end affixed to the tongue, the second webbing length forming a second of the two layers of the lap belt section.

* * * * *